Patented Feb. 5, 1946

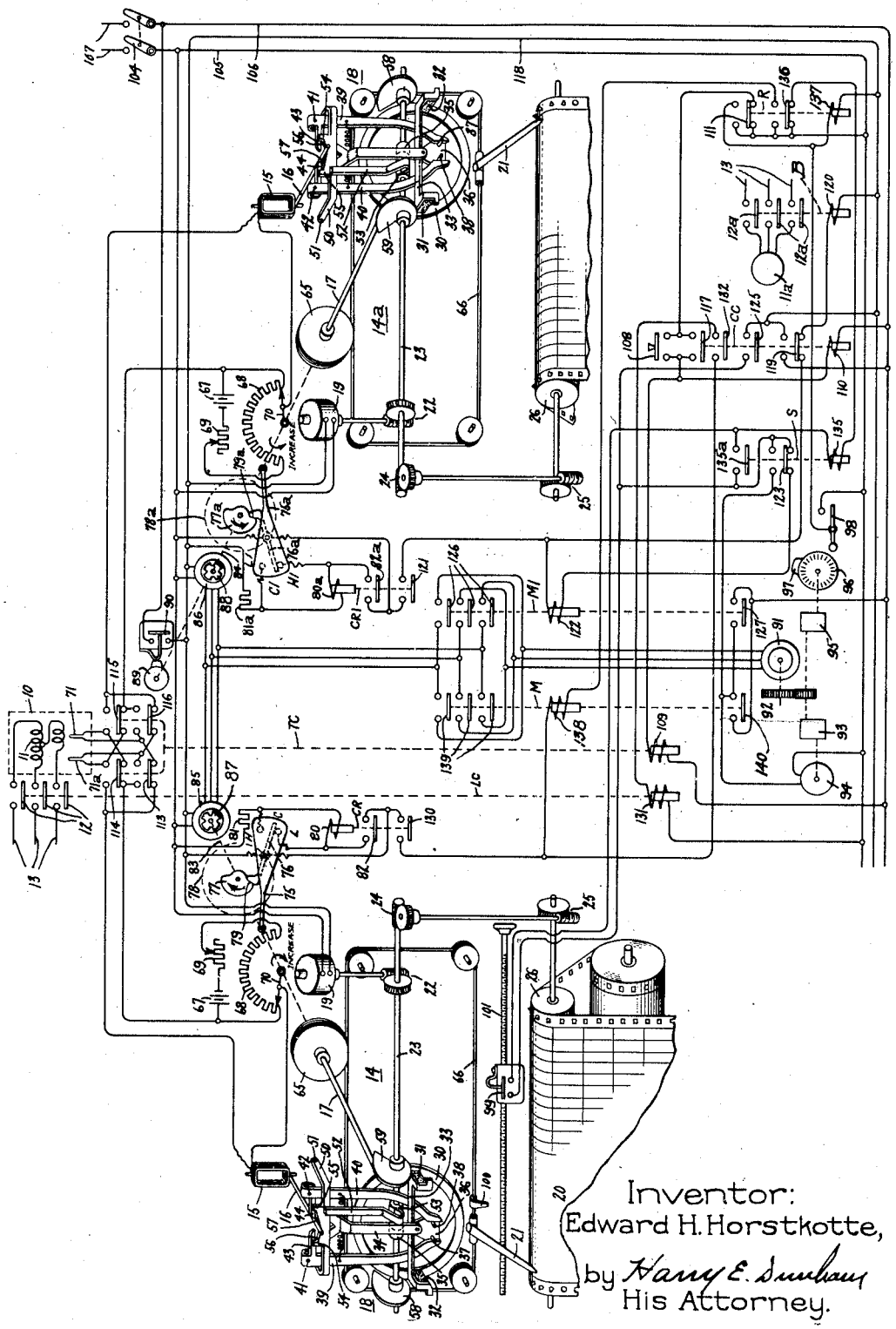

2,394,061

UNITED STATES PATENT OFFICE 2,394,061

CONDITION CONTROL SYSTEM

Edward H. Horstkotte, Erie, Pa., assignor to General Electric Company, a corporation of New York Application January 22, 1943, Serial No. 473,242

18 Claims. (Cl. 236—15)

My invention relates generally to condition control systems and more particularly to temperature control systems for furnaces. Certain features of the invention have particular application to the automatic program control of industrial heating furnaces, such as annealing furnaces and the like.

The annealing of fabricated parts of heavy machinery, such as turbine housings and the like, is commonly complicated by the fact that a single part frequently comprises a number of sections of widely different mass and hence different thermal capacities. Ordinarily, known characteristics of the metal being annealed determine the minimum period for which the maximum temperature attained must be held. However, a limitation is imposed upon the maximum permissible rate of heating and cooling of the charge by the known maximum permissible differential between the temperature of the lightest section, which tends to heat up most rapidly due to its small thermal capacity, and the temperature of the heaviest section, which tends to heat up more slowly due to its large thermal capacity. The maximum temperature differential must be such as to avoid undesired stress, and ordinarily close attendance of the operation by an operator is necessary to maintain heating and cooling rates such that the differential will not be exceeded. To minimize necessary attention by the operator it is customary to set the rates of temperature increase and decrease at such low values that the predetermined maximum permissible temperature differential between the light and heavy sections will surely not be exceeded. However, this procedure is inefficient in that it lengthens the total annealing time unnecessarily.

It is a general object of my invention to provide a condition control system arranged automatically to maintain the maximum permissible rate of change of the condition without exceeding a predetermined differential in the value of the condition between two spaced points of the conditioned object or space.

It is a more specific object of my invention to provide an automatic program control system for a furnace of the type described which will automatically change the temperature of the furnace charge at a maximum permissible rate without exceeding the maximum permissible temperature differential between the lightest and heaviest sections of the charge.

It is a further object of my invention to provide a program control system for an industrial furnace arranged to permit increase of the temperature of the furnace charge at the maximum rate determined by a known maximum permissible temperature differential between the lightest and heaviest sections of the charge, and thereafter to effect cooling of the charge in a like manner.

It is a still further object of my invention to provide an automatic program control system for a furnace arranged first to permit increase of the furnace temperature in the manner described, then to control maintenance of the maximum temperature attained for a predetermined period, and finally to permit decrease of the furnace temperature in the manner described.

By way of example I have shown my invention applied to an on-off control system for an electric furnace. By an "on-off" control system is meant one in which the output of the condition changing means or the input to the conditioned space is changed substantially instantaneously between any two predetermined limiting values in response to whether the temperature or the condition in the space is above or below the desired value. An electric furnace in which the heating resistor is either connected across the full voltage of the supply source or else totally disconnected therefrom by means of a line contactor is an example of an on-off system in which the output is varied between zero and 100 per cent. From the following detailed specification it will appear that my invention is not necessarily limited in its application to on-off control systems, but such a system has been chosen by way of illustration because of its simplicity and its common application to industrial heating furnaces.

For the purpose of controlling a system of the above type in accordance with my invention I provide two complete temperature controlling instruments including means responsive to a controlled temperature and means actuable in accordance with the temperature responsive means for controlling the condition changing means, or furnace to maintain a desired temperature. Each such instrument is provided with an adjustable device for setting a desired temperature to be maintained. These instruments are interconnected in a control system so arranged that during a period of temperature increase one of the temperature controllers is responsive to the temperature of the lightest section of the furnace charge and has its temperature setting continuously increased at a desired rate thereby to increase the temperature of the light section at a corresponding rate. During the temperature increasing period the other temperature controller, which is responsive to the temperature of the heaviest section of the charge, is arranged to stop the increase in the setting of the first controller in the event that the temperature differential between the light and heavy sections of the charge exceeds a predetermined value. A soaking period of constant temperature is provided by maintaining the setting of the first temperature controller at a desired maximum value for a predetermined period. After the soaking period the first and second controllers are interchanged in respect to their response to the temperatures of the light and heavy sections of the charge and the temperature setting of the controller now responsive to the lightest section of the charge is decreased at a desired rate. During the temperature decreasing period the controller responsive to the temperature of the heaviest section of the charge functions only to disable the continuous setting adjustment of the other controller in the event that the maximum permissible temperature differential is exceeded.

My invention itself will be better understood and its object and advantages more fully appreciated by referring now to the following detailed specification taken in conjunction with the accompanying drawing; the single figure of which is a schematic circuit diagram of an electric furnace control system embodying my invention.

Referring now to the drawing I have shown an electric heating furnace 10 comprising an electric heating resistor 11 arranged for connection through the switch contacts 12 of a line contactor LC to a three-phase source of alternating current supply 13 and a fan or blower 11a arranged for connection through the contacts 12a of a blower contactor 13 to the same three-phase source. For controlling the furnace 10 and resistor 11 in the manner described above I have shown a pair of automatic temperature controllers and recorders designated generally as 14 and 14a. The controllers 14 and 14a are identical in structure, so that only one need be described. The same reference numerals have been assigned to like parts of the controller.

The general organization of the recorders and controllers 14 and 14a comprises a galvanometer including a moving coil 15 and a needle 16, and a control shaft 17 and a mechanism 18 for translating deflections of the galvanometer into corresponding movements of the control shaft. The needle 16 is movable to either side of a midposition to indicate the direction and extent of departure of the temperature being measured from a desired value. A substantially constant speed continuously operating motor 19 is arranged periodically to actuate the mechanism 18 and continuously to move a record sheet 20. The control shaft 17 is actuated by the motor 19 and the mechanism 18. The midposition of the shaft is indicative of the actual temperature being measured. A suitable pen or other indicating device 21 is operatively associated with the control shaft 17 continuously to record on the roll 20 the actual temperature measured.

More specifically, the motor 19 is arranged continuously to rotate, through a suitable gearing 22, a motor driven shaft 23. The continuously movable record sheet 20 is also driven from the motor 19 by means of suitable gearing 24 and 25 between the motor driven shaft 23 and a record driving roll 26. The control shaft 17 carries at one end a control disk 30. The face of the control disk 30 is periodically engaged by suitable friction clutching elements 31 and 32 mounted upon the ends of a centrally pivoted lever 33. The lever 33 is pivoted on a horizontal axis as shown in the drawing at the movable end of a continuously oscillating lever 34. The lever 34 is pivotally mounted at its upper end upon a suitable base and is arranged to lie in continuous following engagement with a cam 35 carried by the motor driven shaft 23. The cam 35 and the lever 34 periodically move the clutch members 31 and 32 into and out of clutching engagement with the control disk 30. The lever 33 has connected thereto a short arm 36 carrying a pair of pins 37 and 38 each of which is positioned to be engaged by one of a pair of deflecting levers 39 and 40. The lever 39 is pivotally mounted at 41 and the lever 40 is pivotally mounted at 42 upon the instrument base. The lower ends of the levers 39 and 40 engage the pins 37 and 38 respectively. The deflecting levers 39 and 40 extend in substantially parallel spaced relation between their pivot points 41 and 42 and the pins 37 and 38. At their upper ends the levers 39 and 40 are provided with short perpendicular arms 43 and 44 respectively which extend inwardly toward each other and toward the galvanometer needle 16. The inner ends of the arms 43 and 44 are slightly spaced apart to permit free vertical movement of the galvanometer needle 16 when this needle is in its midposition between the arms.

For periodically raising the galvanometer needle 16 and thereby obtaining a controlling movement proportional to the deflection of the needle, I provide a substantially U-shaped rocker arm 50 pivotally mounted at 51 upon the instrument base and carrying at its outer end a downwardly extending cam follower arm 52. The arm 52 is positioned in continuous following engagement with a cam 53 mounted upon the motor driven shaft 23 and is periodically raised as the cam 53 rotates. The U-shaped rocker arm 50 carries upon its upper edge a pair of projections 54 and 55 which lie adjacent the arms 43 and 44 respectively, and are provided with diverging inclined surfaces 56 and 57, respectively. The fundamental organization of the mechanism 18 is completed by a pair of similar restoring cams 58 and 59 mounted upon the motor driven shaft 23 and arranged to engage opposite ends of the tilting lever 33 to restore it to its midposition after it has been displaced by one of the deflecting levers 39 and 40.

The operation of the galvanometer mechanism 18 may be briefly summarized as follows. Assuming first that the galvanometer needle 16 remains in its midposition as shown in the drawing, the motor driven shaft 23 rotates continuously and periodically to oscillate the lever 34 thereby to move the clutching portions 31 and 32 of the lever 33 into and out of engagement with the surface of the control disk 30 and also periodically to raise the U-shaped rocker arm 50 into engagement with the galvanometer needle 16. However, so long as the needle 16 is in its midposition, raising of the needle has no effect upon the mechanism, for the needle is simply pressed upwardly into the space between the short inwardly extending arms 43 and 44.

If now the galvanometer needle 16 which is freely movable between the arms 43 and 44 and the projections 55 and 56 when the arm 50 is lowered, is displaced to one side of its midposition when the rocker arm 50 is next raised, the lower side of the needle will be engaged by the inclined surface 56 or 57, depending upon the side at which the needle is deflected. For example, let it be assumed that the needle 16 on the controller 14 is to the left of its midposition when the arm 50 is raised. In this case the inclined surface 56 will engage the galvanometer needle and will raise it into engagement with the arm 43 of the deflecting lever 39 so that the arm 43 and the lever 39 will be rotated in a counterclockwise direction as the rocker arm 50 begins its upward movement. Since the surface 56 is inclined, and since the limits of movement of the rocker arm 50 are fixed, it will be clear that the extent of the rotation of the lever 39 upon an upward movement of the rocker arm 50 is directly proportional to the degree of deflection of the galvanometer needle 16 from its midposition. When the lever 39 is rotated counterclockwise its engages the pin 37 on the arm 36 and moves the lever 33 counterclockwise through an angle proportional to the displacement of the needle 16 from the midposition. The cams 35, 53, 58 and 59 upon the motor driven shaft 23 are so arranged that during the tilting movement of the lever 33 the clutching members 31 and 32 are out of engagement with the control disk 30 and the lever 33 is not engaged by the restoring of the cams 58 and 59. Immediately after the rotary displacement of the lever 33 the cam 35 permits the members 31 and 32 to engage the clutching surface of the control disk 30 and shortly after this engagement the restoring cams 58 and 59 are brought into operative relation with the lever 33. In the example assumed the lever 33 is rotated in a counterclockwise direction, as viewed in the drawing, so that as the cams 58 and 59 are rotated only the cam 59 will engage the lever 33 thereby to rotate the lever 33 and the control disk 30 in a clockwise direction and restore the lever 33 to its normal horizontal position. It will thus be clear that whenever the galvanometer needle 16 is found displaced from its midposition upon raising of the rocker arm 50 the mechanism 18 effects a movement of the control shaft 30 in a direction dependent upon the direction of deflection of the needle 16 and by an amount corresponding to the magnitude of the deflection.

In order to obtain from the movement of the control disk 30 an indication of the actual temperature of the furnace, the control shaft 17 is provided with a drum 65 connected to drive a wire 66 which carries the pen 21.

The manner in which the galvanometer needle 16 is deflected in proportion to the deviation of the actual temperature of the furnace 10 from a desired value will be clear from a consideration of the potentiometer circuit shown connected to the galvanometer coil 15. This circuit comprises a battery 67 connected continuously to supply current to a slide wire 68 through a variable resistor 69. The resistor 69 provides a manual adjustment by means of which the total voltage drop across the slide wire 68 may be controlled. A variable potentiometer voltage which is taken off between one end of the slide wire 68 and a movable contact arm 70 connected to the control shaft 17 is balanced against the voltage of a thermocouple 71 or 71a located in the furnace 10. As will be explained more fully hereinafter the thermocouples 71 and 71a may be selectively and alternatively connected to the controllers 14 and 14a. With the thermocouple contactor in the position shown in the drawing the thermocouple 71 is connected to the controller 14 and the thermocouple 71a is connected to the controller 14a. The circuit through which the opposing voltages of the thermocouple 71 and the potentiometer 68 are balanced includes the coil 15 of the galvanometer, so that when the potentiometer voltage is equal to the voltage of the thermocouple and no current flows and the galvanometer coil 15 assumes its mid-position. It will now be evident that the galvanometer 15, 16 and the mechanism 18 function as a followup system to maintain the potentiometer voltage at the slider 70 substantially equal and opposite to the voltage of the connected thermocouple 71 or 71a as determined by the temperature measured by the thermocouple.

The final position of the potentiometer slider 70 when the measured temperature is at its desired value may be selected by manipulation of the control resistor 69. So far as the parts of the apparatus heretofore described are concerned, the position of the slider 70 when the furnace temperature is at the control point is immaterial. However, for coordination with other parts of the apparatus to be described hereinafter and for simplicity of illustration it will be assumed that the resistor 69 is so positioned that when the furnace temperature is at the maximum desired value the slider 70 of the controller 14 will be rotated clockwise substantially 180° from the position shown in the drawing and the slider 70 of the controller 14a will be rotated 180° counterclockwise from the position shown.

The controller 14 is arranged to actuate a control relay CR, and for this purpose the control shaft 17 carries a radial arm 75 upon the end of which is mounted a suitable double throw cam switch 76. The switch 76 is provided with a movable center contact C and with a pair of stationary contacts H and L. The entire switch 76, including the contacts C, H, L, is mounted upon the arm 75 for rotation by the shaft 17 about a selector or setting cam 77 and in a path indicated by the broken line 78. The position of a shoulder 79 on the cam 77 determines the position of the control point of the shaft 17 and thus determines the temperature being held by the controller 14. To hold the temperature at the point thus determined the relay CR comprises an energizing winding 80 connected in series circuit relation with a current limiting resistor 81 and a holding interlock contact 82 to a source of electric current supply. The contacts C and L of the switch 76 are arranged when closed to shunt the normally open interlock contact 82 and thereby to pick up the relay CR. Conversely, the contacts H and C of the switch 76 are arranged when closed to shunt the energizing winding 80 of the relay and thereby to drop out the relay. Thus when connected to regulate furnace temperature the controller 14 functions when the temperature being measured is below the desired point to close the contacts C and L of switch 76 thereby to energize the relay CR and increase the output of the furnace. When the temperature is above the desired point the contacts C and H of the relay 76 are closed by the controller 14 thereby to drop out the relay CR and decrease the temperature of the furnace.

Referring now to the controller 14a, the control shaft 17 of that controller carries an arm 75a on the end of which is mounted a double throw cam switch 76a including a movable center contact C1 and fixed contacts L1 and H1. The switch 76a is movable by the control shaft 17 in an arc 78a for cooperation with a selector or setting cam 77a. The position of a shoulder 79a on the cam 77a determines the control point of the control shaft 17 for the controller 14a and thus determines the temperature being held by this controller when connected for direct temperature control. The switch 76a controls a control relay CR1 comprising an energizing winding 80a connected in series circuit relation to a source of electric current supply with a current limiting resistor 81a and a holding interlock contact 82a.

It will be noted that the contacts L1 and H1 of the switch 76a are reversed with respect to the contacts H and L of the switch 76. Thus in the position of the switch 76a shown in the drawing indicating that the temperature being held is above the desired point, the contacts C1 and H1 of the switch 76a are closed to shunt the interlock contact 82a and pick up the relay CR1 rather than to drop it out in the manner of the relay CR when the contacts C and H of the switch 76 are closed. Similarly the contacts C1 and L1 of the switch 76a are closed when the temperature to be held by the controller 14a is below the desired point thereby to shunt the energizing winding 80a of the control relay CR1 and to drop out the control relay CR1. As will appear hereinafter the reason for reversal of the contacts L1 and H1 with respect to the contacts L and H is that the controller 14, when connected for direct control of temperature controls the heating resistor 11, while the controller 14a, when connected for direct temperature control, controls the blower 11a. Thus, while the resistor must be energized at subnormal temperature, the blower must be deenergized at subnormal temperatures.

According to the invention the setting cams 77 and 77a are mounted on setting shafts 83 and 84 respectively for movement in synchronism by a pair of parallel connected reversible synchronous motors 85 and 86 respectively simultaneously to increase or to decrease the settings of the temperature controllers and recorders 14 and 14a respectively. In order to determine the relative initial positions of the cams 77 and 77a with respect to the motors 85 and 86 respectively a pair of friction clutches 87 and 88 are interposed between the motors 85 and 86 and the shafts 83 and 84 respectively. The synchronous motor shaft 84 also carries a cam 89 arranged to open a normally closed switch 90 when the shaft 84 is set in the minimum temperature position. The purpose of the switch 90 will be more fully explained in connection with the description of the operation of the system as a whole.

My system also comprises a thermocouple contactor TC for interchanging the connections of the thermocouples 71 and 71a with the controllers 14 and 14a, and a pair of reversing contactors M and M1 for reversing the connections of the synchronous motors 85 and 86 to a synchronous generator 91. As will be evident from the drawing, the synchronous motors 85 and 86 and the synchronous generators 91 are illustrated as three phase machines and therefore may be reversed by interchanging the connection of two of the three connecting leads. This operation is effected by the contactors M and M1. The synchronous generator 91 is driven through suitable gearing 92 and 93 by means of a substantially constant speed synchronous motor 94. The gearing 93 may be any conventional adjustable ratio gearing to provide speed control for the generator 91. The motor 94 also drives through suitable adjustable ratio gearing 95 an adjustable cam 96. The cam 96 is arranged to rotate so slowly that it makes only one complete revolution in the maximum time that may ever be contemplated for a complete annealing operation. For example, the cam 96 may make one revolution in about forty-five hours. This cam is provided with an adjustable shoulder 97 which is arranged to actuate a switch 98. The switch 98 has for its purpose the initiation of the temperature decreasing portion of an annealing cycle as will appear hereinafter.

For the purpose of stopping the continuous increase of the controller settings by the synchronous motors 85 and 86 the controller 14 is provided with an adjustably positioned normally open limit switch 99 arranged to be closed by a cam 100 operatively connected to the recording pen 21 of the controller and recorder 14. As illustrated in the drawing the switch 99 may be carried by a traveling nut mounted upon a threaded shaft 101 so that it may be adjustably positioned for closure when the temperature held by the recorder 14 attains any selected value.

With the foregoing understanding of the construction and arrangement of the various component parts of my apparatus, the operation of the system as a whole may be readily understood from the following detailed description.

Let it first be assumed that the furnace 10 contains a charge having heavy and light sections of widely different thermal capacities. The thermocouple 71a should then be positioned upon the lightest section of the charge with the least thermal capacity and the thermocouple 71 positioned upon the heaviest section of the charge with the greatest thermal capacity. If desired, the thermocouple 71a may be located for response to the air temperature within the furnace, since the temperature of the lightest section follows the air temperature within the furnace quite closely. Let it be further assumed that the desired annealing cycle consists of a heat increasing period during which the temperature of the charge is raised 650° C. above room temperature, that the temperature is then held for six hours at the final temperature, and that the charge is then cooled to its initial temperature. Since it is also known that the maximum permissible temperature differential between the lightest and heaviest sections of the part being annealed is definitely limited it may be further specified that the foregoing operation shall be carried out without exceeding a temperature differential between the sections of more than 50° C. Let it also be assumed that heat increasing and heat decreasing rates of 50° C. per hour are approximately correct to ensure operation upon the point of maximum permissible temperature differential. To set the system for this operation the setting cams 77 and 77a are set approximately in the positions shown in the drawing so that the control point of the cam 77a lags the control point of the cam 77 by 50° C. This setting is accomplished by manual slipping of the friction clutches 87 and 88. The limit switch 99 on the controller 14 is then set at 650° C. above room temperature. The speed of the synchronous generator 91 is adjusted, for example by means of the adjustable ratio gear reducing unit 93, so that the generator 91 and the motors 85 and 86 rotate at such a speed that the setting cams 77 and 77a are advanced at the rate of 50° C. per hour. Finally the shoulder 97 on the adjustable cam 96 is set so that it will close the switch 98 at the end of nineteen hours on the graduated cam 96.

To initiate operation a suitable manual control switch 104 is closed to energize a pair of control wires 105 and 106 from a suitable source of electric current supply 107. The furnace may then be set in operation by depressing a push button 108. The push button 108 completes energizing circuit for an actuating coil 109 of the thermocouple contactor TC and an actuating coil 110 of a control contactor CC. The energizing circuit for the actuating coil 109 may be traced from the control wire 106 through the energizing coil 109, the contacts of the push button 108, and a normally closed contact 111 upon a reversing relay R to the control wire 105. The energizing circuit for the actuating coil 110 of the control contactor CC may be traced from the wire 106 through the coil 110, the contacts of the push button 108, and the contact 111 of the relay R to the wire 105. When the thermocouple contactor TC picks up it actuates four double throw contacts 113, 114, 115 and 116 from their lower positions shown in the drawing to their upper positions and thereby connects the thermocouple 71 to the controller 14a and the thermocouple 71a to the controller 14. The controller 14 will now measure the temperature of the lighest section of the charge and the controller 14a will measure the temperature of the heaviest section. When the control contactor CC picks up itself in and also locks in the contactor TC through a holding interlock contact 117 on the contactor CC. Through a contact 119 the contactor CC also connects the control wire 106 to a control wire 118. The contact 119 shunts the switch 90 which is now held open by the setting shaft 84 by reason of the fact that the shaft 17 of the controller 14a is in its minimum temperature position. In picking up the contactor CC, also through its switch contact 119, insures disabling of an energizing winding 120 for the blower contactor B.

As soon as the wire 118 is energized a circuit is completed through the actuating winding 80a of the control relay CR1. This circuit may be traced from the control wire 106 through the contact 119 on the control contactor CC, the wire 118, the current limiting resistor 81a, the actuating winding 80a of the control relay CR1, and the contacts C1 and H1 of the controller cam switch 76a to the control wire 105. When the relay CR1 picks up it closes a holding circuit for its own actuating coil through its interlock contact 82a and also closes a switch contact 121. Through the switch contact 121 a circuit is completed for an actuating winding 122 of the motor contactor M1. This energizing circuit may be traced from the control wire 105 through the switch contact 121 of the relay CR1, the actuating winding 122 of the contactor M1, a normally closed contact 123 on a soaking relay S and the contacts 125 and 119 of the control contactor CC to the control wire 106. When the motor contactor M1 picks up it closes its line contacts 126 to connect the synchronous motors 85 and 86 to the synchronous generator 91 for forward rotation. The contactor M1 also closes an interlock contact 127 to complete an energizing circuit for the synchronous motor 94 from the control wire 105 through the motor 94 and the interlock contact 127 to the control wire 106. In this way the setting cams 77 and 77a of the controllers 14 and 14a are set into motion continuously to advance the setting of the controllers at a constant predetermined rate.

The controller 14 now operates to maintain the temperature of the lightest section of the furnace charge at the control point as determined by the gradually advancing cam 77. Regulation of the temperature is effected by relative movement of the cam 77 and the cam switch 76 to control the control relay CR. This operation may be best understood by assuming for the moment that the setting cam 77 is stationary so that a predetermined constant temperature is to be held. If the temperature as indicated by the thermocouple 71a is below the desired temperature the control shaft 17 will be moved in a counterclockwise direction with respect to the cam shoulder 79 so that the contacts C and L of the switch 76 will be closed as shown in the drawing. Through the contacts C and L an energizing circuit will be completed for the actuating winding 80 of the control relay CR. This energizing circuit may be traced from the control wire 105 through the current limiting resistor 81, the actuating winding 80 of the control relay CR, the contacts C and L of the switch 76, the wire 118, and the contact 119 of the control contactor CC to the wire 106. When the control relay CR picks up, it locks itself in through its holding interlock contact 82 and also closes a switch contact 130. Through the switch contact 130 an energizing circuit is completed for an actuating winding 131 of the furnace line contactor LC. This energizing circuit may be traced from the control wire 105 through the actuating winding 131, a contact 132 on the control contactor CC, the switch contact 130 on the control relay CR, the wire 118, and the contact 119 of the control contactor CC to the control wire 106. With the line contactor LC closed, the furnace will heat up until the controller shaft 17 and the switch 76 of the controller 14 are advanced in a clockwise direction sufficiently far so that the cam shoulder 79 opens the contacts C and L and closes the contacts C and H of the control switch 76. When the contacts C and H of the switch 76 are closed, a shunt circuit is completed across the actuating winding 80 of the relay CR, thereby deenergizing the relay and disabling the energizing circuit of the actuating winding 131 on the line contactor LC. In this way the furnace heating resistor is deenergized. Thus it will be evident that so long as no interfering influence is present, the controller 14 will operate to maintain the temperature measured by the thermocouple 71a, that is, the temperature of the lightest section of the furnace charge, at the point determined by the position of the setting cam 77. It will now be apparent from the foregoing explanation that, if the cam 77 is continuously moved to advance the setting, as by the motor 85, the controller 14 will function gradually to increase the temperature of the light section of the furnace charge.

While the setting cam 77 is rotated clockwise by the motor 85 and the switch 76 is maintained on the control point of the cam 77 and thus rotated clockwise by the control shaft 17 of the controller 14 in following engagement with the cam 77, the setting cam 77a of the controller 14a is being rotated counterclockwise at the same speed by the motor 86. If now there is no temperature difference between the light and heavy sections of the part being annealed so that the thermocouples 71 and 71a are measuring the same temperature, the cam follower portion of the switch 76a will be maintained ahead of the control point of the cam 77a because of the fact that the cam 77a is set 50° C. behind the cam 77. That is, so long as the temperature differential between the heavy and light sections of the furnace charge is within 50° C., the cam switch 76a will be ahead of its control point and will be in the position shown in the drawing with respect to the cam 77a. In this position of the switch the control relay CR1 is maintained picked up to complete the previously traced energizing circuit for the motor contactor M1.

If now the temperature of the heavy section, as measured by the thermocouple 71, lags more than 50° C. behind the temperature of the lightest section of the charge, the cam 77a will advance relative to the switch 76a. Such movement will cause the shoulder 79a of the cam 77a to actuate the switch 76a to its other position, thereby closing the contacts C1 and L1. When the contacts C1 and L1 are closed, the control relay 71a will be dropped out by short circuiting of its actuating coil through the contacts C1, L1 and the interlock contacts 82a. Upon dropping out of the control relay CR1 the energizing circuit for the motor contactor M1 is interrupted, thereby disabling the energizing circuits previously traced for the motor 94, the generator 91, and the synchronous motors 85 and 86. Upon cessation of operation of the motors 85, 86 and 94 the settings of the controllers 14 and 14a are now held at the point at which the synchronous motors 85 and 86 were stopped, and the controller 14a maintains the temperature of the light section of the charge fixed at the temperature thus determined until the temperature of the heaviest section of the charge comes within 50° C. of the temperature of the lightest section. When this occurs, the controller 14a will move the switch 76a to the forward side of the control point of the cam 77a so that the control relay CR1 again picks up and reestablishes the energizing circuit for the motor contactor M1, thereby again to set into operation the motor 94 and the synchronous motors 85 and 86.

It will be noted that during cessation of operation of the synchronous motors 85 and 86, due to a temperature differential greater than the predetermined 50° C., the timing cam 96 is also stopped due to stoppage of the motor 94. By interrupting the movement of the timing cam 96 the length of the entire annealing cycle is increased by the period necessary for the temperature of the heavy section of the charge to come within 50° of the temperature of the light section of the charge. Stoppage of the cam 96 is necessitated by the fact that when the setting motors 85 and 86 are stopped upon the occurrence of an excessive temperature differential the average rate of heating of the charge is decreased below the predetermined maximum rate. This means that the maximum desired temperature for soaking will not be attained at the time planned. Since the soaking period is initiated by temperature rather than time, as will appear hereinafter, the soaking period would be prematurely concluded if the timing cam 96 were not stopped along with the motors 85 and 86.

When the temperature of the lightest section of the furnace charge reaches the desired maximum, assumed to be 650° C. above room temperature, the cam 100 associated with the pen 26 of the controller and recorder 14 will close the limit switch 99. With the motors 85 and 86 moving at a speed to increase the furnace temperature at a rate of 50° per hour, as previously assumed, the switch 99 will be closed at the end of 13 hours plus the sum of any periods of shut-down of the motors 85 and 86 occasioned by operation of the temperature differential controller 14a. When the switch 99 is closed, it completes an energizing circuit for an actuating coil 135 of the relay S. This energizing circuit may be traced from the control wire 106 through the contacts 119 and 125 of the control contactor CC, the limit switch 99 on the controller 14, the winding 135 of the relay S, and a contact 136 on the reversing relay R to the control wire 105. When the soaking relay S picks up it closes a holding circuit for its own actuating coil through an interlock contact 135a. In picking up the relay S also opens its contact 123 to disable the energizing circuit for the actuating winding 122 of the motor contactor M1 so that the contactor M1 drops out to shut down the motors 85 and 86. The timing cam 96, however, continues to rotate because a holding circuit is established for the synchronous motor 94 through the contact 123 of the soaking relay S when energized. This substitute energizing circuit for the motor 94 may be traced from the control wire 105 through the motor 94, the contact 123 of the relay S, and the contacts 125 and 119 of the control contactor CC to the control wire 106. Thus, during the soaking period the motor 94 continues to rotate the timing cam 96, but the synchronous motors 85 and 86 and the setting cams 77 and 77a of the controllers 14 and 14a respectively are at standstill. The controller 14, thus functions in the manner previously described to maintain the predetermined maximum temperature until the shoulder 97 of the timing cam 96 engages the switch 98.

When the switch 98 is closed, the cooling period is initiated by the establishment of an energizing circuit through the switch 98 for an actuating winding 137 of the reversing relay R. This energizing circuit may be traced from the control wire 105 through the switch 98, the actuating winding 137, the wire 118 and the contact 119 of the control contactor CC to the control wire 106. When the reversing relay R picks up, it disables at a contact 136 the energizing circuit for the actuating coil 135 of the soaking relay S so that the relay S drops out. In picking up its contact 111, the reversing relay R also disables the energizing circuits for the actuating windings 109 and 110 of the thermocouple contactor TC and the control contactor CC respectively. When the thermocouple contactor TC drops out, it moves its contacts 114—116 inclusive to their lower positions shown in the drawing thereby to connect the thermocouple 71 on the heaviest section of the furnace charge to the controller 14, and to connect the thermocouple 71a on the lightest section of the furnace charge to the controller 14a. However, in moving its contact 119 to the lower position the control contactor CC does not effect a disconnection of the wire 118 from the control wire 106 because of the fact that the limit switch 90, which is connected to bridge the contact 119 in its upper position, is now closed because of prior movement of the setting shaft 84 of the motor 86 away from its minimum setting position. In picking up, the relay R also connects an actuating winding 138 of the motor contactor M to the control wire 105 through the contact 136 of the relay R in its upper position.

With the foregoing operation in mind, it will be evident that at the initiation of the cooling period of the cycle the connection of the thermocouples on the light and heavy sections of the charge is reversed with respect to the controllers 14 and 14a and circuits prepared for the motor contactor M in place of the motor contactor M1 and the blower contactor B in place of the line contactor LC. It will also be noted that the motor contactor M1 will now be controlled by the controller 14 for differential control while the blower contactor B will be controlled by the controller 14a for direct temperature control. Thus the functions of the controllers 14 and 14a as well as the direction of rotation of the setting motors 85 and 86 will be reversed as will appear more fully hereinafter. The motor contactor M is provided with switch contacts 139 which, when closed, connect the motors 85 and 86 to the synchronous generator 91 for rotation in a direction to decrease the setting of the controllers 14 and 14a. Furthermore, reversal of the thermocouple connections has the effect of connecting the controller 14a, which now controls the furnace blower 11a, for response to the temperature of the light section of the charge, and connecting the controller 14, which now exercises the differential control function through the contactor M1, for response to the temperature of the heaviest section of the charge. This reversal is accomplished so that the relative positions of the setting cams 77 and 77a need not be changed for cooling operation. In cooling the heavy section, due to its greater thermal capacity, always tends to lag the temperature of the lighter section and thus remains at a higher temperature. During the temperature increase, on the other hand, the heavy section temperature, due to the lag, remains at a lower temperature than the lighter section. Therefore during temperature increase the heavy section is connected to the controller 14a of lower setting for differential control and during the temperature decreasing period the heavy section is connected for differential control to the controller 14 having the higher setting.

If now during the soaking period the entire furnace charge has attained a uniform temperature, the switch 76 will be on the control point of the cam 77 and the switch 76a will be 50° C. on the high side of the control point of the cam 77a at the instant of transfer of the thermocouple connections. At the instant of transfer described above, no immediate change is made in the positions of the switches 76 and 76a, since both thermocouples are assumed to be measuring the same temperature. Therefore, the cam switch 76a will be in the position shown in the drawing with its contacts C1 and H1 closed. As previously described, the control relay CR1 will therefore be picked up and will have its switch contact 121 closed. Through this contact an energizing circuit is now completed for the actuating winding 120 of the blower contactor B. This energizing circuit may be traced from the control wire 105 through the contact 121 of the control relay CR1, the contact 119 of the control contactor CC, now in its lowermost position, the winding 120 of the blower contactor B and the switch 90 to the control wire 106. The blower 11a will now cool the furnace and its charge. The cooling operation will be controlled by the controller 14a and the relay CR1 in response to the temperature of the lightest section of the charge to maintain the temperature of this section at the setting of the controller cam 77a.

At the beginning of the cooling operation described above the switch 76 will be in the position shown in the drawing with respect to the cam 77 so that the contacts C and L of this switch will be closed and the relay CR picked up. With the relay CR picked up an energizing circuit is completed for the actuating winding 138 of the motor contactor M. This circuit may be traced from the control wire 106 through the limit switch 90, the wire 118, the switch contacts 130 of the control relay CR, the actuating winding 131 of the motor contactor M and the contact 136 of the reversing relay R in its actuated position to the control wire 105. Thus the synchronous motor 94 is again energized through a motor contactor interlock contact 140 on the motor contactor M, and the synchronous motors 85 and 86 are connected to the synchronous generator 91 for rotation in a direction continuously to decrease the setting of the controllers 14 and 14a. Now by alternate operation and non-operation of the blower 11a under the control of the controller 14a and the relay CR1, the temperature of the lightest section of the furnace charge is made to follow the continuously decreasing setting of the controller 14a.

In a manner analogous to that previously described in connection with the temperature increasing period, the differential controller, which is now the controller 14, will permit the direct temperature controller, which is now the controller 14a, to function without interruption so long as the temperature differential between the light and heavy sections of the charge does not exceed the predetermined 50° C. If, however, the temperature of the light section of the charge should fall more than 50° C. below the higher temperature of the heavy section of the charge, or conversely, if the temperature of the heavy section lags the temperature of the light section by more than 50° C., the shoulder 79 of the cam 77, now rotating in a counterclockwise direction, will overtake the switch 76 and will cause the switch to close its contacts C and H. Upon closing of the contacts C and H the actuating winding 80 of the control relay CR is shunted and the relay CR drops out. When the relay CR drops out its switch contact 130 disables the energizing circuit for the actuating winding 138 of the motor contactor M, thereby to disconnect the motors 85 and 86 from the generator 91 and to disable the energizing circuit for the synchronous driving motor 94. In this manner the heat decreasing cycle is interrupted and the setting of the direct temperature controller 14a on the light section is maintained constant until, either by operation of the blower 11a, under the control of the controller 14a, or by heat conduction between the sections, the temperature of the heavy section comes within 50° C. of the light section. When the temperature of the heavy section again comes within the permissible differential range the switch 76 is actuated to close its contacts C and L and the cycle proceeds with a constantly decreasing setting of the cams 77 and 77a as heretofore described.

After the above described cooling operation has proceeded for thirteen hours plus the sum of any periods of shutdown of the motors 85 and 86 by the differential controller 14 the setting shaft 84 of the motor 86 will have again arrived at its initial position so that the cam 89 will open the limit switch 90. When the limit switch 90 is open the entire apparatus is shut down by disconnection of the wire 118 with the wire 106. Since the switch 90 is included in the energizing circuits of the control relays CR and CR1 and the reversing relay R, all these relays will drop out. Furthermore, since the control relay CR disables the energizing circuit of the motor contactor M and the control relay CR1 disables the energizing circuit of the blower contactor B, the motor contactor M and the blower contactor B will drop out. Accordingly since all the contactors and relays are now dropped out it will be evident that the synchronous motor 94 is disabled and the entire apparatus shut down.

From the foregoing description of my invention it appears that I have provided a program control system for a furnace or like condition changing apparatus which will automatically increase the value of the condition at a rate no greater than a predetermined rate until a predetermined maximum value of the condition is attained while maintaining the temperature differential between two points within the conditioned space within a predetermined limit. My system will also maintain the maximum value of the condition for any predetermined period and will then automatically reduce the value of the condition at a rate no greater than a predetermined rate while maintaining the temperature differential between the two control points within a predetermined limit. This entire operation is performed with the addition of very little apparatus other than a temperature recorder and controller for measuring each of the two controlling temperatures. For furnace control the system comprises one temperature controller directly to regulate the temperature at the highest temperature point upon temperature increase and means for changing the setting of the direct controller at a predetermined rate, in combination with a second controller responsive to a selected lower temperature in the furnace to disable the setting changing means whenever the temperature differential exceeds a predetermined value. To reverse the operation and reduce the temperature the functions and response of the two temperature controllers are interchanged and the setting changing means is reversed.

While I have described only one preferred embodiment of my invention by way of illustration, many modifications will undoubtedly occur to those skilled in the art, and I therefore wish to have it understood that I intend by the appended claims to cover all such modifications as fall within the true spirit and scope of my invention.

What I claim as new and desire to secure by Letters Patent of the United States, is:

1. In a condition control system for a conditioned space having a plurality of sections of different thermal capacities, the combination of condition changing means, control means responsive to the value of said condition at a first section of said space for controlling said condition changing means to maintain the value of said condition at said first section at a selected value, adjusting means for changing the setting of said control means at a desired rate to effect a desired rate of change of said condition at said first section, and means responsive to the value of said condition at a second section of said space for disabling said adjusting means upon the occurrence of a predetermined differential between the values of said condition at said sections.

2. In a condition control system for a conditioned space having a plurality of sections of different thermal capacities, the combination of condition changing means, first control means responsive to the value of said condition at a first section of said space having a small thermal capacity for controlling said condition changing means to maintain the value of said condition at said first section at a selected value, first adjustable means for changing the setting of said first control means at a desired rate to effect a desired rate of increase of said condition at said first section, second control means responsive to the value of said condition at a second section of said space having a large thermal capacity for disabling said first adjusting means upon the occurrence of a predetermined differential between the values of said condition at said first and second sections, and means for substantially simultaneously interchanging the response and functions of said first and second control means and reversing the operation of said adjusting means to effect a desired rate of decrease of said condition at said first section while maintaining the differential between said sections no greater than said predetermined differential.

3. In a furnace control system for annealing a charge having a plurality of sections of different thermal capacities, the combination of means for supplying heat to said furnace, means responsive to the temperature of a first section of said charge for controlling the output of said heat supplying means to maintain the temperature of said first section at a selected value, adjusting means for changing said selected value at a desired rate to effect a desired rate of temperature change of said charge, and means responsive to the temperature of a second section of said charge for disabling said adjusting means upon the occurrence of a predetermined temperature differential between said sections.

4. In a furnace control system for annealing a charge having a plurality of sections of different thermal capacities, the combination of means for changing the temperature of said furnace, first and second control means, means for connecting said first control means for response to the temperature of a first section of said charge having a small thermal capacity, and for direct control of said temperature changing means, means operable in conjunction with said first connecting means for connecting said second control means for response to the temperature of the second section of said charge of larger thermal capacity and for control of the operation of said first control means, and means responsive to a predetermined maximum temperature of said first section for connecting said second control means for direct control of said temperature changing means and substantially simultaneously connecting said first control means for controlling the operation of said second control means.

5. In a condition control system for a condition space having a plurality of sections of different thermal capacities, the combination of condition changing means, first and second control means, means connecting said first control means for direct control of said condition changing means in response to the value of said condition at a first section of said space and for simultaneously connecting said second control means for differential control of said first control means in response to the value of said condition at a second section of said space, movable selector means for simultaneously and continuously changing the settings of said control means while maintaining a predetermined differential between said settings thereby to effect a desired rate of change of said condition and to maintain the temperature differential between said sections no greater than said predetermined differential, means for reversing the operation of said selector means, and means operable in conjunction with said reversing means for connecting said second control means for direct control of said condition changing means in response to the value of said condition at said first section and simultaneously connecting said first control means for differential control of the operation of said second control means in response to the value of said condition at said second section of said space.

6. In a furnace control system for annealing a charge having a plurality of sections of different thermal capacities, the combination of means for supplying heat to said furnace, first control means responsive to the temperature of a first section of said charge having a small thermal capacity for controlling the output of said heat supplying means to maintain the temperature of said first section at a selected value, driving means for continuously varying the setting of said first control means to increase said selected value at a desired rate thereby to effect a desired rate of heating of said charge, second control means responsive to the temperature of a second section of said charge heaving a larger thermal capacity for controlling the operation of said driving means to maintain the temperature lag of said second section within a predetermined maximum differential limit, said driving means being arranged to maintain the setting of said second control means below the setting of said first control means by the amount of said differential limit, means for reversing said driving means to effect a continuous decrease in the settings of said control means, and means operable in conjunction with said reversing means for reversing the response and functions of said control means, thereby to effect a desired rate of cooling of said charge without exceeding said differential limit.

7. In a furnace control system for annealing a charge having a plurality of sections of different thermal capacities, the combination of means for supplying heat to said furnace, means responsive to the temperature of a first section of said charge of small thermal capacity for controlling the output of said heat supplying means to maintain the temperature of said first section at a selected value, adjusting means for increasing said selected value at a desired rate to effect a desired rate of heating of said charge, and means responsive to temperature of a second section of said charge of large thermal capacity for disabling said adjusting means whenever the temperature lag of said second section with respect to said first section exceeds a predetermined differential limit.

8. In a furnace control system for annealing a charge having a plurality of sections of different thermal capacities, the combination of means for cooling said furnace, means responsive to the temperature of a first section of said charge having a small thermal capacity for controlling said cooling means, adjusting means for changing the setting of said temperature responsive means to maintain said first section of said charge at a continuously decreasing temperature, and means responsive to the temperature of a second section of said charge having a greater thermal capacity for disabling said adjusting means whenever the temperature lag of said second section with respect to said first section exceeds a predetermined differential limit.

9. In a system for controlling a condition, a conditioned space having a plurality of sections of different thermal capacities, condition changing means, a pair of condition control devices each including a member positionable in accordance with the value of said condition at one of said sections of said space, condition changing means, movable selector means operable in conjunction with one of said positionable members to control said condition changing means for maintaining said condition at a first section of said space at a value determined in accordance with the position of said selector means, driving means for continuously moving said selector means to change the value of said condition of said first section at a predetermined rate, and second movable selector means driven by said driving means and operable in conjunction with the other of said positionable members in accordance with the value of said condition at a second section of said space to disable said driving means when the difference of the values of said condition at said sections exceeds a predetermined differential limit.

10. In a furnace control system for annealing a charge having a plurality of sections of different thermal capacities, a furnace, means for supplying heat to said furnace, a pair of control device each including a member positionable in accordance with the temperatures at one of said sections, movable selector means operable in conjunction with a first of said positionable members to control said heat supplying means for maintaining the temperature at one of said sections at a selected value determined by the position of said selector means, driving means for continuously moving said selector means to change the temperature at said first section at a desired rate, and second selector means driven by said driving means and operable in conjunction with the other of said positionable members in accordance with the temperature at another of said sections to disable said driving means whenever the difference of the temperatures at said sections of said change exceeds a predetermined differential limit.

11. In a system for controlling the temperature of an element having a plurality of sections of different thermal capacities, a furnace, temperature changing means for said furnace, a pair of temperature responsive members each positioned for response to a separate section of said element, a control device connected to each of said temperature responsive members and including a member positionable in accordance with the temperature indicated by the connected temperature responsive member, movable selector means operable in conjunction with one of said control devices to control said temperature changing means for maintaining the temperature at the associated section at a value determined by the position of said selector means, driving means for continuously moving said selector means at a predetermined rate to change the temperature at said first section of said element at a corresponding rate, means inculding second movable selector driven by said driving member and operable in conjunction with the other of said control devices to control said driving means for maintaining the temperature differential between said sections less than a predetermined limiting value, means for reversing said driving means, and means operable in conjunction with said reversing means for substantially simultaneously interchanging the control of said temperature changing means and said driving means by said control devices and interchanging the connection of said temperature responsive members to said control devices thereby to reverse the direction of temperature change of said element.

12. In a furnace control system for annealing a charge having a plurality of sections of different thermal capacities, temperature changing means for said furnace, a first control device including means responsive to the temperature of a first section of said charge of small thermal capacity for directly controlling said temperature changing means to maintain the temperature of said first section at a selected value, said control device including movable selector means variably positionable to set said selected value, driving means for continuously moving said selector means to increase the setting of said first control device thereby to increase the temperature of said first section at a desired rate, a second control device including means responsive to the temperature of a second section of said charge having a relatively large thermal capacity for controlling said driving means, said second control device including second movable selector means driven by said driving means synchronously with said first selector means and operable in conjunction with the associated temperature responsive means to disable said driving means whenever the temperature at said second section lags the instantaneous setting of said first control device by more than a predetermined limiting differential value.

13. A furnace control system for annealing a charge having a plurality of sections of different thermal capacities comprising temperature changing means for said furnace, a pair of temperature responsive elements each arranged for response in accordance with the temperature at one of said sections, a control device associated with each of said temperature responsive elements and including a member adjustably positionable in accordance with the temperature of the associated temperature responsive element, means operable in conjunction with one of said positionable members directly to control said temperature changing means for maintaining the temperature of a first section of said charge at a selected value, selector means operable in conjunction with said first positionable member to select the temperature to be maintained, constant speed driving means for continuously increasing the setting of said selector means at a predetermined rate to produce a corresponding rate of change of the temperature of said first section of said charge, means operable in conjunction with the other of said positionable members to disable said driving means at a selected temperature of a second section of said charge, and second movable selector means connected to said driving member for synchronous movement in fixed relation with said first selector means to determine said selected temperature in accordance with the instantaneous setting of said first selector means.

14. A control system for an annealing furnace comprising a furnace adapted to anneal a charge having a plurality of sections of different thermal capacities, means for changing the temperature of said furnace, a pair of temperature responsive elements each arranged for response in accordance with the temperature at one of said sections, a control device associated with each of said temperature responsive elements and including a member adjustably positionable in accordance with the temperature of the associated section of said charge, means operable in conjunction with one of said positionable members to control said temperature changing means for maintaining the temperature of a first section of said charge of small thermal capacity at a selected value, movable selector means operable in conjunction with said first positionable member to select the temperature to be maintained, constant speed driving means for continuously increasing the setting of said selector means to produce a desired rate of increase in the temperature of said first section, means operable in conjunction with the other of said positionable members to disable said driving means at a selected temperature of a second section of said charge of larger thermal capacity, and second movable selector means connected to said driving means for synchronous movement in fixed following relation with said first selector means to determine said selected temperature thereby to maintain the temperature differential between said sections less than a predetermined limiting value.

15. A program temperature control system for an annealing furnace adapted to anneal a charge having a plurality of sections of different thermal capacities comprising a furnace, means for changing the temperature of said furnace, a plurality of temperature responsive elements each arranged for response in accordance with the temperature of one of said sections, a control device associated with each of said temperature responsive elements and including a member adjustably positionable in accordance with the temperature of the associated element, means operable in conjunction with one of said positionable members to control said temperature changing means for maintaining the temperature of a first section of said charge of small thermal capacity at a selected value, movable selector means operable in conjunction with said first positionable member to select the temperature to be maintained, constant speed driving means for continuously increasing the setting of said selector means to increase the temperature of said first section of said charge at a predetermined rate, means operable in conjunction with the other of said positionable members to disable said driving means at a selected temperature of a second section of said charge of larger thermal capacity, second movable selector means connected to said driving means for movement in fixed following relation with said first selector means and operable in conjunction with said second positionable member to determine said selected temperature thereby to limit the maximum temperature lag of said second section with respect to said first section to a predetermined value, and means responsive to a predetermined maximum temperature of said first section of said charge for disabling said driving means independently of said second control device and said temperature lag.

16. A program temperature control system for an annealing furnace adapted to anneal a charge having a plurality of sections of different thermal capacities comprising a furnace, means for supplying heat to said furnace, a plurality of temperature responsive elements each arranged for response in accordance with the temperature at one of said sections, a control device associated with each of said temperature responsive elements and including a member adjustably positionable in accordance with the temperature of the associated element, means operable in conjunction with one of said positionable members directly to control said heat supplying means for maintaining a first section of said charge of small thermal capacity at a selected temperature, movable selector means operable in conjunction with said first positionable member to select the temperature to be maintained, constant speed driving means for continuously increasing the setting of said movable selector means to increase the temperature of said first section of said charge at a predetermined rate, means operable in conjunction with the other of said positionable members to disable said driving means at a second selected temperature of a second section of said charge of larger thermal capacity, second movable selector means operable in conjunction with said second positionable member to determine said second selected temperature and connected to said driving means to maintain the setting of said second selector means below the setting of said first selector means by a predetermined differential limit, and timing means operable in conjunction with said driving means for reversing said driving means and substantially simultaneously interchanging the connections of said temperature responsive elements to said control devices and of said control devices for direct and differential control.

17. A program temperature control system for an annealing furnace arranged to anneal a charge having a plurality of sections of different thermal capacities comprising a furnace, means for supplying heat to said furnace, means for cooling said furnace, a pair of temperature responsive elements each arranged for response in accordance with the temperature of one of said sections, a control device associated with each of said temperature responsive elements and including a member adjustably positionable in accordance with the temperature of the associated element, means operable in conjunction with one of said positionable members directly to control said heat supplying means for maintaining a first section of said charge of small thermal capacity at a selected temperature, movable selector means operable in conjunction with said first positionable member to select the temperature to be maintained, constant speed driving means for continuously increasing the setting of said movable selector means to increase the temperature of said first section of said charge at a predetermined rate, means operable in conjunction with the other of said positionable members to disable said driving means at a second selected temperature of a second section of said charge of larger thermal capacity, second movable selector means operable in conjunction with said second positionable member to determine said second selected temperature and connected to said driving means to maintain the setting of said second selector means in fixed relation to and below the setting of said first selector means by a predetermined differential limit, timing means operatively connected to said driving means for connecting said second control device for direct control of said cooling means and connecting said first control device for control of said driving means, and means controlled by said timing means for reversing said driving means and interchanging the connections of said temperature responsive elements to said control devices.

18. In a control system for annealing a charge having a plurality of sections of different thermal capacities, a furnace, means for changing the temperature of said furnace, a pair of movable members adjustably positionable in accordance with the temperatures at selected sections of said charge, timing means operable in conjunction with a first of said positionable members to increase the temperature of the first section of said charge at a desired rate and operable in conjunction with the other of said positionable members to hold constant the temperature of said first section in response to a temperature at a second section of said charge lagging the temperature of said first section by more than a predetermined differential limit, reversing means controlled by said timing means to connect said timing means for operation in conjunction with said second positionable member to decrease the temperature of said first section at a desired rate and for operation in conjunction with said first positionable member to hold the temperature of said first section constant in response to a temperature at said second section lagging the temperature at said first section by more than said differential limit.

EDWARD H. HORSTKOTTE.

Certificate of Correction

Patent No. 2,394,061. February 5, 1946.

EDWARD H. HORSTKOTTE

It is hereby certified that errors appear in the printed specification of the above numbered patent requiring correction as follows: Page 5, first column, line 27, after "up" insert *it locks*; page 9, second column, line 64, for "inculding" read *including*; and that the said Letters Patent should be read with these corrections therein that the same may conform to the record of the case in the Patent Office.

Signed and sealed this 15th day of October, A. D. 1946.

[SEAL]

LESLIE FRAZER,
*First Assistant Commissioner of Patents.*